US011122417B2

(12) United States Patent
Foti et al.

(10) Patent No.: US 11,122,417 B2
(45) Date of Patent: Sep. 14, 2021

(54) SUPPORT FOR MANUAL ROAMING FOR VOLTE

(71) Applicant: Telefonaktiebolaget LM Ericsson (publ), Stockholm (SE)

(72) Inventors: George Foti, Dollard des Ormeaux (CA); Shabnam Sultana, Montreal (CA); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/759,409

(22) PCT Filed: Oct. 29, 2018

(86) PCT No.: PCT/IB2018/058457
§ 371 (c)(1),
(2) Date: Apr. 27, 2020

(87) PCT Pub. No.: WO2019/087045
PCT Pub. Date: May 9, 2019

(65) Prior Publication Data
US 2020/0329364 A1     Oct. 15, 2020

(30) Foreign Application Priority Data
Oct. 30, 2017  (WO) ................ PCT/CN2017/108294

(51) Int. Cl.
*H04W 8/12* (2009.01)
*H04W 8/18* (2009.01)

(52) U.S. Cl.
CPC ............... *H04W 8/12* (2013.01); *H04W 8/18* (2013.01)

(58) Field of Classification Search
CPC ............. H04L 65/1016; H04L 65/1006; H04L 65/1069; H04L 29/06027; H04L 65/1033;
(Continued)

(56) References Cited

U.S. PATENT DOCUMENTS

2002/0131395 A1* 9/2002 Wang .................. H04L 65/1006
                                                            370/349
2003/0064723 A1* 4/2003 Thakker .................. H04W 8/06
                                                            455/432.1
(Continued)

FOREIGN PATENT DOCUMENTS

WO       2007016695 A2    2/2007
WO   WO-2017169904 A1 * 10/2017   .............. H04W 8/06

OTHER PUBLICATIONS

Author Unknown, "Technical Specification Group Services and System Aspects; Study on Support of voice over WLAN; Enhancements (Release 15)," Technical Report 23.751, Version 15.0.0, 3GPP Organizational Partners, Jun. 2017, 26 pages.
(Continued)

*Primary Examiner* — Nathan S Taylor
(74) *Attorney, Agent, or Firm* — Withrow & Terranova, PLLC

(57)  ABSTRACT

Methods and systems providing support for manual roaming in a telecommunications network are provided. According to one aspect, a method for manual roaming implemented in a Mobility Management Entity (MME) comprises: receiving, from a User Equipment (UE) a request to access the telecommunications network, the request comprising an indication that Local Operator Services, LOS, are desired; determining that authentication information for authenticating the UE is unavailable; and, in response to determining that the authentication information is unavailable, routing the UE to a portal for acquiring manual roaming access to the telecommunications network. If the user of the UE acquires (e.g., purchases) manual roaming access, the MME will receive an indication of such from the portal and grant the UE access. The UE may be restricted to accessing only a subset of LOS services. The UE may be directed to a
(Continued)

special Access Point Name (APN) configured for manual roamers.

4 Claims, 12 Drawing Sheets

(58) Field of Classification Search
CPC ............... H04L 65/105; H04L 65/1073; H04L 65/4007; H04L 69/16; H04L 69/164; H04L 9/30; H04L 29/06; H04W 4129/06; H04W 8/18; H04W 8/12; H04W 12/0023; H04W 12/00514; H04W 12/02; H04W 12/04; H04W 12/06; H04W 12/08; H04W 48/02; H04W 48/12; H04W 48/16; H04W 48/18; H04W 4/16; H04W 4/90; H04W 60/00; H04W 76/10; H04W 76/27; H04W 76/50; H04W 80/06; H04W 80/10; H04W 84/042; H04W 8/205; H04M 11/04; H04M 1/2535; H04M 1/72536; H04M 2242/04; H04M 2242/14; H04M 2242/30; H04M 3/436; H04M 3/5116; H04M 7/006

See application file for complete search history.

(56) References Cited

U.S. PATENT DOCUMENTS

| | | | |
|---|---|---|---|
| 2006/0268835 A1 | 11/2006 | Hyotylainen et al. | |
| 2007/0060097 A1* | 3/2007 | Edge | H04W 8/205 455/404.1 |
| 2008/0144615 A1* | 6/2008 | Casey | H04L 45/00 370/389 |
| 2010/0144311 A1* | 6/2010 | Pehrson | H04W 8/06 455/406 |
| 2011/0111734 A1* | 5/2011 | Walker | H04L 67/16 455/414.1 |
| 2011/0130117 A1* | 6/2011 | Fan | H04W 4/24 455/411 |
| 2012/0185578 A1* | 7/2012 | Perkuhn | H04L 65/1016 709/223 |
| 2013/0242867 A1* | 9/2013 | Bell | H04W 4/70 370/328 |
| 2015/0181364 A1 | 6/2015 | Chen et al. | |
| 2017/0134444 A1* | 5/2017 | Buckley | H04W 4/10 |
| 2017/0195869 A1 | 7/2017 | Knudsen et al. | |
| 2019/0028957 A1* | 1/2019 | Hashimoto | H04W 76/15 |
| 2019/0037518 A1* | 1/2019 | Russell | H04W 8/24 |
| 2019/0044980 A1* | 2/2019 | Russell | H04W 12/06 |
| 2019/0053139 A1* | 2/2019 | Basu Mallick | H04W 12/08 |
| 2019/0053328 A1* | 2/2019 | Kunz | H04L 65/1073 |
| 2019/0159115 A1* | 5/2019 | Russell | H04L 61/3015 |
| 2019/0313319 A1* | 10/2019 | Qiao | H04L 12/1407 |
| 2019/0335392 A1* | 10/2019 | Qiao | H04W 48/18 |
| 2020/0068451 A1* | 2/2020 | Mih Ly | H04W 36/0022 |
| 2020/0205090 A1* | 6/2020 | Loehr | H04W 52/40 |
| 2020/0329364 A1* | 10/2020 | Foti | H04W 8/18 |

OTHER PUBLICATIONS

Author Unknown, "Understanding IMS," Anritsu, www.Anritsu. com, Issue 2, Sep. 2013, 24 pages.

Invitation to Pay Additional Fees and Partial Search for International Patent Application No. PCT/IB2018/058457, dated Jan. 9, 2019, 12 pages.

International Search Report and Written Opinion for International Patent Application No. PCT/IB2018/058457, dated Apr. 8, 2019, 23 pages.

* cited by examiner

SUPPORT FOR MANUAL ROAMING FOR VOLTE

RELATED APPLICATION

This application is a 35 U.S.C. § 371 national phase filing of International Application No. PCT/IB2018/058457, filed Oct. 29, 2018, which claims the benefit of PCT application serial number PCT/CN2017/108294, filed Oct. 30, 2017, the disclosures of which are hereby incorporated herein by reference in their entireties.

TECHNICAL FIELD

The present disclosure relates to roaming on Long Term Evolution (LTE) networks, and more specifically to manual roaming for Voice over LTE (VoLTE).

BACKGROUND

In telecommunications networks, a mobile device or User Equipment (UE) must request, and be granted, access to the network, a process referred to as attachment, before the mobile device may communicate over that network. Whether a mobile device is granted or denied access to a network may depend on whether the user of that device is a subscriber to the network in question. A network to which the user is subscribed is commonly referred to as the user's home network, and networks to which the user is not subscribed are commonly referred to as visited networks. When a mobile device is operating outside of the user's home network, e.g., operating within a visited network, the user and/or device is said to be "roaming."

Attach/Authentication

FIG. 1A is a signaling message diagram illustrating messages communicated among components of a telecommunications network according to a conventional Attach procedure, which includes an authentication step. For this and subsequent signaling message diagrams, the sequence of messages may be referred to as a "call flow," and the signaling message diagram may also be referred to as a "call flow diagram." In the embodiment illustrated in FIG. 1A, telecommunications network 100, which may also be referred to simply as "network 100," includes a User Equipment (UE) 102, a Mobility Management Entity (MME) 104, and a Home Subscriber Server (HSS) 106. A UE may be referred to as a Wireless Device (WD), a Mobile Terminal (MT), or a Wireless Transmitter/Receiver Unit (WTRU). In one embodiment, telecommunications network 100 comprises an Evolved Packet System (EPS). In EPS, an authentication procedure is mandatory for a normal Attach.

The process illustrated in FIG. 1A has three phases: mutual authentication of the UE 102 and the MME 104, referred to as mutual authentication 108; establishment of a security context 110; and release 112. Each of these phases will be addressed in turn.

In the embodiment illustrated in FIG. 1A, the mutual authentication process 108 begins when the UE 102 send to the MME 104 a request for attachment, tracking area update, and/or service request (message 114). In response, the MME 104 sends to the HSS 106 a request for authentication information (message 116). The HSS 106 responds with an authentication information answer (message 118). The MME 104 then uses the authentication information to issue an authentication request (message 120) to the UE 102, and the UE 102 will issue an authentication response (message 122) to the MME 104. The mutual authentication process 108 is performed when no valid security context exists for the UE 102 and the MME 104, when integrity protection measures have failed, or when selective authorization has been configured.

In the embodiment illustrated in FIG. 1A, if the mutual authentication process 108 is successful, the establishment of a security context process 110 begins with the MME 104 issuing a security mode command (message 124) to the UE 102. The UE 102 responds to the MME 104 indicating that the security mode command was completed (message 126). The establishment of a security context process 110 uses algorithms agreed upon by the UE 102 and the MME 104, and is the start of integrity protection and ciphering.

In the embodiment illustrated in FIG. 1A, the release process 112 comprises an S1 release, i.e., ECM-IDLE. The existing security context can be used again, even after the UE has been detached or has moved to a new MME.

However, the call flow shown in FIG. 1A requires that the MME 104 be able to receive authentication information from the HSS 106. If the UE 102 is within the subscriber's home network, for example, the MME 104 is able to get the needed information from the HSS 106, resulting in a successful Attach. Likewise, where the UE 102 is not within the subscriber's home network, but is instead operating within a visited network, which may also be referred to as a visited area, if the home network and visited network have a roaming agreement, the MME 104 (which will also be in the visited network) is provided access to the HSS 106 in the subscriber's home network. This also results in a successful Attach.

Manual Roaming

On the other hand, if the UE 102 is operating within a visited network that does not have a roaming agreement with the subscriber's home network, the HSS 106 in the home network may deny requests for authentication from the MME 104 in the visited network, or the MME 104 may not have access to the HSS 106 in the subscriber's home network at all, in which case the Attach will fail because authentication cannot be performed. This scenario is illustrated in FIG. 1B.

FIG. 1B is a signaling message diagram illustrating messages communicated among components of a telecommunications network according to a conventional Attach procedure in which authentication fails. In the example illustrated in FIG. 1B, the UE 102 issues an Attach message (message 128). The MME 104 receives the message and attempts to retrieve authentication information, but determines that authentication information is unavailable (action 130). In response to this determination, the MME 104 will notify the UE 102 that the Attach failed (message 132).

As used herein, the term "manual roaming" is used to refer to the scenarios described above, e.g., where a user roams in a visited area but the service provider in the visited area, also referred to as the visited network, has no relationship or agreement with the roaming user's home network, also referred to as a home domain. In this case, the roaming user cannot make or place calls unless special arrangements can be made. The term "manual roaming" may also be applied to the scenario where there is a roaming agreement between the visited domain and the home domain: manual roaming in this case can be a service that avoids long distance charges for the roaming user. A subscriber in a manual roaming scenario may be referred to herein as "a manual roamer," "a manually roaming subscriber," or "a manually roaming user."

One conventional approach to the problems with manual roaming is to provide the user with a local subscription using a local number and to download the needed credentials to the user device. In this approach, however, the user cannot use his original Mobile Station International Subscriber Directory Number (MSISDN)—colloquially referred to as the user's mobile number, cellphone number, or telephone number—and cannot be reached unless he notifies all potential callers of his new temporary number.

Another conventional approach to the problems with manual roaming is to enable the user to originate calls (make outgoing calls) using his or her original MSISDN, e.g., by temporarily enabling the UE MSISDN for originating calls that bypass normal authentication. In this approach, however, the user cannot receive calls at all while manually roaming.

Thus, conventional solutions to the problems of manual roaming have distinct shortcomings.

SUMMARY

The subject matter of the present disclosure provides support for manual roaming for VoLTE in LTE or 5G. The embodiments herein are described with LTE, but they are also applicable to 5G. The present disclosure presents a solution in which a manual roamer is able to originate and receive VoLTE calls using his or her original phone number. The present disclosure also proposes a solution to accept a normal Attach with failed authentication so that the manual roamer can access the VPLMN's portal to enable the service.

According to one aspect, a method for manual roaming in a telecommunications network and implemented in a Mobility Management Entity (MME) comprises: receiving, from a User Equipment (UE), a non-emergency request to access the telecommunications network; determining that authentication information for authenticating the UE is unavailable; and, in response to determining that the authentication information is unavailable, sending to the UE a response that comprises an indicator that the UE was not authenticated.

According to another aspect, a method for manual roaming in a telecommunications network and implemented in a User Equipment (UE) comprises: sending, to a node in the telecommunications network, a request to access the telecommunications network; receiving, from the node in the telecommunications network, a response to the request, the response comprising an indicator that the UE was not authorized; and, in response to receiving the indicator that the UE was not authorized, sending, to the node in the telecommunications network, a message acknowledging the response to the request.

According to another aspect, a method for manual roaming in a telecommunications network and implemented in a MME comprises: receiving, from a UE, a request to access the telecommunications network, the request comprising an indication that Local Operator Services (LOS) are desired; determining that authentication information for authenticating the UE is unavailable; and, in response to determining that the authentication information is unavailable, routing the UE to a portal for acquiring manual roaming access to the telecommunications network.

According to another aspect, a method for manual roaming in a telecommunications network and implemented in a UE comprises: sending, to a node in the telecommunications network, a request to access the telecommunications network, the request comprising an indication that Local Operator Services, LOS, are desired; being routed by the node in the telecommunications network to a portal for acquiring manual roaming access to the telecommunications network.

According to another aspect, a method for manual roaming in a telecommunications network and implemented in a visited network portal comprises: establishing a session with a User Equipment (UE) for acquiring manual roaming access to the visited network; providing, to the UE, manual roaming access to the visited network; providing an address of an Application Server (AS) and instructions for configuring transfer service to the AS; and notifying a Mobility Management Entity (MME) that the UE has been granted manual roaming access to the telecommunications network.

According to another aspect, a method for manual roaming in a telecommunications network and implemented in a UE comprises: sending, to a node in the telecommunications network, a request to access the telecommunications network, the request comprising an indication that Local Operator Services (LOS) are desired; and receiving a response to the first According to another aspect, a method for manual roaming in a telecommunications network and implemented in a Proxy Call/Session Control Function (P-CSCF) comprises: receiving, from a User Equipment (UE), a registration request to access the telecommunications network, the request comprising an International Mobile Subscriber Identity (IMSI) number and an indication that Local Operator Services (LOS) are desired; retrieving the IMSI from the request; sending, to a visited network portal, a request to validate the IMSI; receiving, from the visited network portal, a response to the request to validate the IMSI; creating a record for the UE and allocating, for the UE, a Serving CSCF (S-CSCF) that has been configured to support requests that include an indication that LOS are desired; forwarding the request to the allocated S-CSCF; receiving, from the allocated S-CSCF, a result of the request; and forwarding, to the UE, the result of the registration request.

According to another aspect, a method for manual roaming in a telecommunications network and implemented in a visited network portal comprises: receiving a request to validate an International Mobile Subscriber Identity (IMSI) number; validating the received IMSI number; and sending a response to the request to validate the IMSI.

According to another aspect, a method for manual roaming in a telecommunications network and implemented in a S-CSCF comprises: receiving a registration request to access the telecommunications network, the registration request comprising an IMSI number associated with a User Equipment (UE); determining that the registration request comprises an indication that Local Operator Services (LOS) are desired; in response to determining that the LOS are desired, creating a record for the UE and a default profile allowing the UE to only make and receive calls.

According to one aspect, a method for establishment of an IMS session (e.g., VoLTE session) by manual roamer is provided. A UE of a manual roamer desiring access to Restricted Local Operator Services, RLOS, inserts a special indicator in the session initiation request and includes the requested RLOS in the Request-URI of the session initiation request. Upon receipt by a P-CSCF of such a request and if the P-CSCF supports RLOS, the P-CSCF shall accept the session as long as the requested RLOS service in the incoming Request-URI is configured in the P-CSCF. The P-CSCF shall forward the incoming request to the S-CSCF allocated to the UE at registration. The P-CSCF shall reject an incoming session without an RLOS indication for users marked as "RLOS only users".

According to another aspect, a method for manual roaming in a telecommunications network and implemented in a UE comprises: sending, to a P-CSCF, a message comprising an indication that Local Operator Services (LOS) are desired; receiving an address of an Application Server (AS); and sending, to a Telephony Application Server (TAS), an instruction to configure communication transfer to the AS.

According to another aspect, a method for manual roaming in a telecommunications network and implemented in an Application Server (AS) comprises: receiving a SIP INVITE message related to a terminating session; determining that the SIP INVITE message came from a specified network node and related to manual roamers; and upon determining that the SIP INVITE message came from the specified network node, forwarding the SIP INVITE, via an I-CSCF, message to an S-CSCF configured for processing requests related to manual roaming.

According to another aspect, a method for manual roaming in a telecommunications network and implemented in a S-CSCF configured for processing requests related to manual roaming comprises: receiving a SIP INVITE message; determining that the SIP INVITE message came from a specified network node; and, in response to determining that the SIP INVITE message came from the specified network node, proxying the SIP INVITE message to an P-CSCF configured for processing requests related to manual roaming.

According to another aspect, a method for manual roaming in a telecommunications network and implemented in a MME comprises: receiving a request for access to the telecommunications network by a UE; determining that authentication of the UE was successful; in response to determining that authentication of the UE was successful, determining that LOS are desired; in response to determining that LOS are desired, initiating a session towards an Access Point Name (APN) configured for LOS to connect the user to a portal for LOS.

According to another aspect, a method for manual roaming in a telecommunications network and implemented in a MME comprises: receiving a request for access to the telecommunications network by a UE; determining that authentication of the UE was not successful; in response to determining that authentication of the UE was not successful, determining that LOS are desired; in response to determining that LOS are desired, initiating a session towards an portal for LOS to connect the user to a portal for LOS.

According to another aspect, a method for manual roaming in a telecommunications network and implemented in a portal for LOS comprises: establishing a session with a manually roaming UE desiring LOS services; granting access to the manually roaming UE; and notifying a MME that access has been granted to the manually roaming UE.

According to another aspect, a MME configured to support manual roaming in a telecommunications network comprises a radio interface and processing circuitry configured to perform any of the methods described herein.

According to another aspect, a UE configured to support manual roaming in a telecommunications network comprises a radio interface and processing circuitry configured to perform any of the methods described herein.

According to another aspect, a visited network portal configured to support manual roaming in a telecommunications network comprises a radio interface and processing circuitry configured to perform any of the methods described herein.

According to another aspect, a CSCF configured to support manual roaming in a telecommunications network comprises a radio interface and processing circuitry configured to perform any of the methods described herein.

According to another aspect, an AS configured to support manual roaming in a telecommunications network comprises a radio interface and processing circuitry configured to perform any of the methods described herein.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Methods and systems for enabling a manual roamer to use his or her own mobile number (i.e., the MSISDN) both originate and receive VoLTE calls without restrictions or the shortcomings of conventional solutions are presented. In some embodiments, a UE that fails authentication may be directed to a portal where the user is presented with instructions how to acquire service. In some embodiments, the user provides the number of a credit card to access fees may be charged. In some embodiments, the portal acquires the UE's IMSI and MSISDN. The user may be instructed to configure explicit communication transfer services at home to a specific IP address that depends on his home location and is provided by the portal.

If the home domain has a roaming agreement with the visited domain, then for Internet Protocol (IP) Multimedia System (IMS) networks, the UE performs a normal IMS registration, and is allocated a S-CSCF. If the home domain has no roaming agreement with the visited domain, then user will have an unregistered profile that enables a S-CSCF to still service the UE while not registered for terminating sessions to the UE. In one embodiment, the next time the UE initiates an initial attach, the MME may connect the UE to the requested IMS Access Point Name (APN) in the visited domain. In one embodiment, the MME is configured with the UE IMSI/MSISDN from the portal through off line means. The UE is now able to originate call using his MSISDN as usual. For terminating session to the UE MSISDN, the user configured transfer services transfers the services, such as a terminating session to the UE, to an AS in the home domain which is routed to the visited domain to another AS, or directly to an AS in the visited domain and from there on to the UE.

Registration to EPC and IMS

Figure 2:
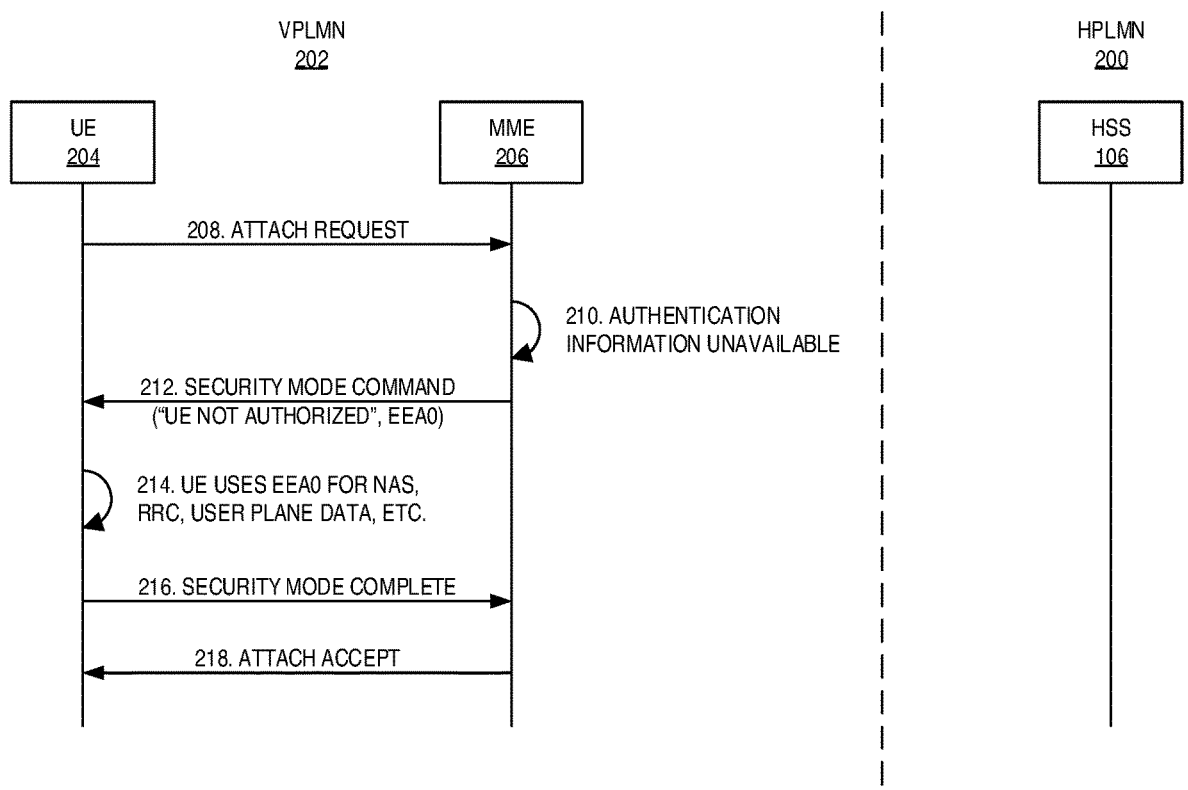
FIG. 2 is a signaling message diagram illustrating messages communicated among components of a telecommunications network according to one aspect of the present disclosure.
Figure 3:
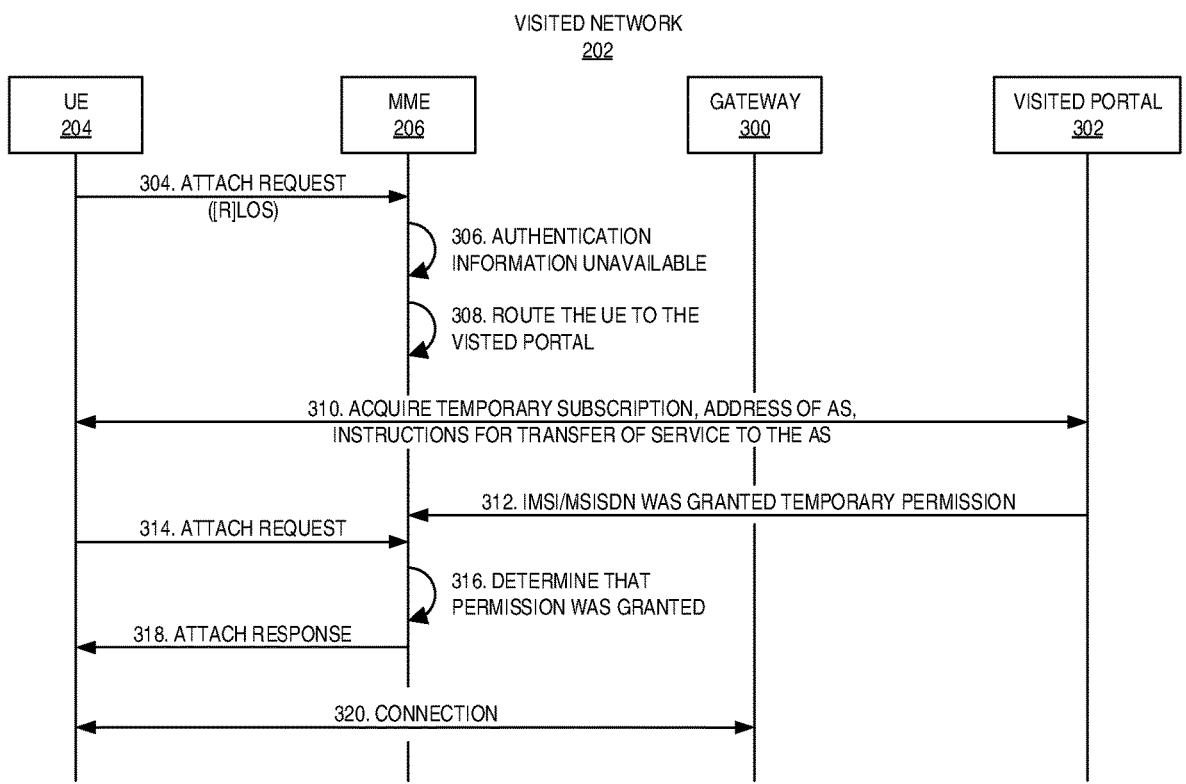
FIGS. 3-5 are signaling message diagrams illustrating messages communicated among components of a telecommunications network according to another aspect of the present disclosure.
Figure 4:
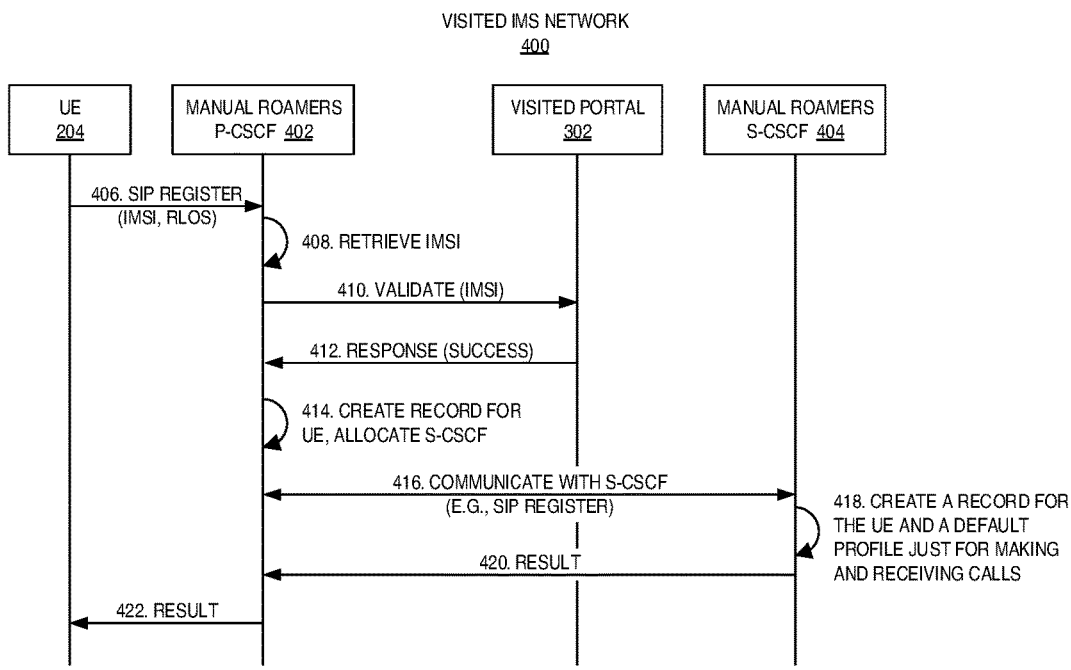

FIGS. 2-4 illustrate examples of how a mobile-originated call may be handled during manual roaming.

FIG. 2 is a signaling message diagram illustrating messages communicated among components of a telecommunications network according to one aspect of the present disclosure. FIG. 2 shows a home network 200 and a visited network 202, where the distinction between "home" and "visited" is made from the perspective of the user or subscriber of a UE 204 operating according to embodiments of the present disclosure. In the example illustrated in FIG. 2, both the home and visited networks are Public Land Mobile Networks (PLMNs), in which case home network 200 may also be referred to as Home PLMN (HPLMN) 200 and visited network 202 may also be referred to as Visited PLMN (VPLMN) 202.

Figure 1A:
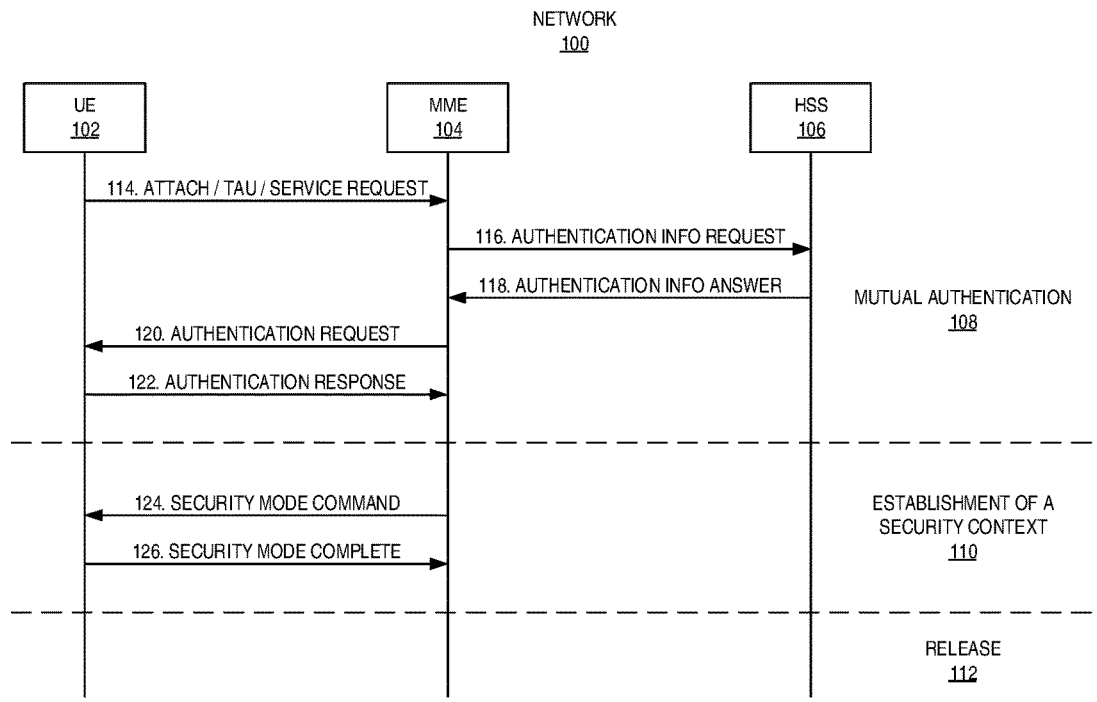
FIGS. 1A and 1B are signaling message diagrams illustrating messages communicated among components of a telecommunications network according to a conventional Attach procedure.
Figure 1B:
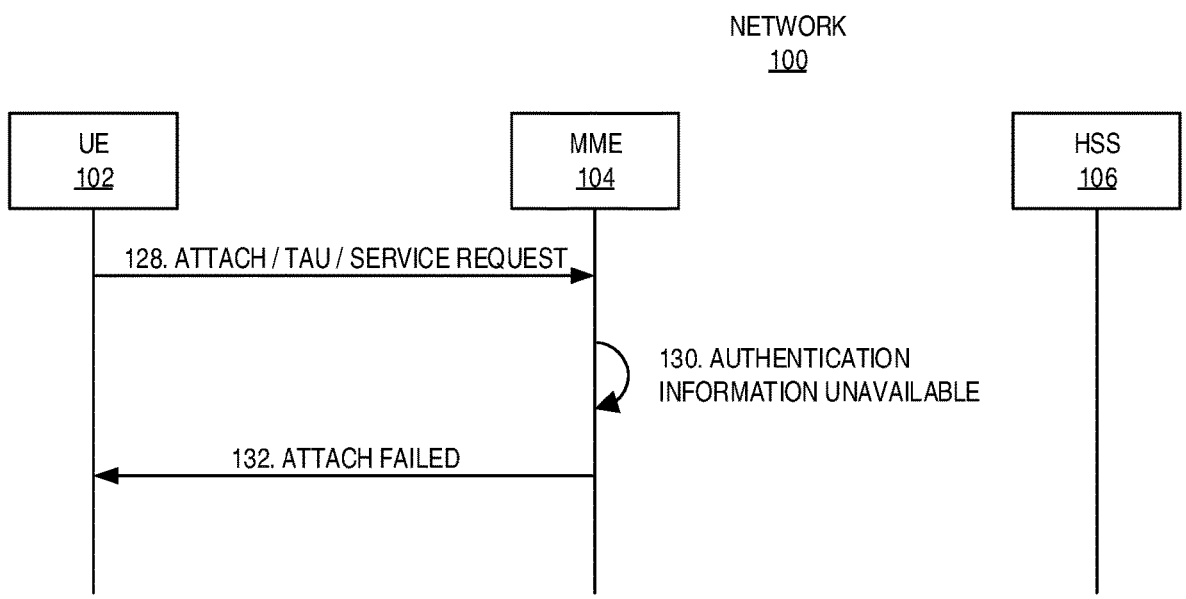

In the embodiment illustrated in FIG. 2, visited network 202 includes an MME 206 operating according to embodiments of the present disclosure. Home network 200 includes an HSS 106 that is essentially identical to the like-numbered element in FIG. 1, the description of which is therefore not repeated here.

FIG. 2 illustrates a call flow for manual roaming according to one embodiment of the present disclosure. In the embodiment illustrated in FIG. 2, the UE 204 attempts to perform a normal Attach to the visited network 202, e.g., by sending an attach request (message 208).

In the embodiment illustrated in FIG. 2, in response to receiving the attach request, the MME 206 attempts to retrieve authentication information (block 210), but cannot retrieve authentication information from the HSS 106 for some reason. The reason might be that the MME 206 cannot determine the identity, network address, or network location of the HSS 106 and thus cannot communicate with the HSS 106.

In the embodiment illustrated in FIG. 2, in response to the failure to retrieve authentication information, the MME 206 sends to the UE 204 a Security Mode Command (message 212), the command including a new indication, e.g., "UE not authorized" or similar, and an indication that the UE 204 should use an Evolved Packet System (EPS) Encryption Algorithm (EEA), such as the EEA0 null ciphering algorithm that is used when making an emergency call, in its response. However, in contrast to the emergency call scenario, in which the attach type will be an EPS emergency attach, in the scenario illustrated in FIG. 2 the attach type will be a normal EPS attach. Another difference from the emergency call scenario is that, in an emergency call scenario, the UE 204 will know from the attach type that there is an emergency attach: no additional information is needed (or supplied) to the UE 204. In contrast, in the scenario illustrated in FIG. 2, the UE 204 receives a normal EPS attach and therefore needs additional information, which is supplied by the new indication "UE not authorized" within the Security Mode Command (message 212); otherwise, the UE will fail the procedure due to no authentication.

Thus, in the embodiment illustrated in FIG. 2, the UE 204 responds to message 212 and the "UE not authorized" indication by using EEA0 for encryption of Non-Access Stratum (NAS), Radio Resource Control (RRC), and User Plane (UP) data (block 214), and sending the appropriate Security Mode Complete (message 216) to the MME 206. The MME 206 sends an Attach Accept (message 218) to the UE 204. Without the "UE not authorized" indication, the UE 204 will fail the procedure for lack of mutual authentication between the UE 204 and the VPLMN 202. Instead, FIG. 2 illustrates the point that attachment during non-emergency situations may be allowed anyway under certain circumstances. As will be illustrated in FIG. 3, below, one of those circumstances may be that the user of the UE 204 will be given an opportunity to pay a fee to the VPLMN 202 to manually roam and still keep his or her original MSISDN.

FIG. 3 is a signaling message diagram illustrating messages communicated among components of a telecommunications network according to another aspect of the present disclosure. FIG. 3 illustrates another view of the visited network 202. In the embodiment illustrated in FIG. 3, visited network 202 includes the UE 204 and the MME 206, but also includes gateway 300 as well as a visited portal 302. The visited portal 302 may also be referred to herein as visited network portal 302, as network portal 302, or as portal 302. In one embodiment, the gateway 300 may be a Serving Gateway (SGW), a Packet Data Network Gateway (PGW), another type of gateway, or combinations of the above.

The process illustrated in FIG. 3 begins when the UE 204 attempts to attach to the visited network 202 (message 304), but fails authentication (action 306). In the embodiment illustrated in FIG. 3, in response to the failure to authenticate, the UE 204 is routed to the visited portal 302 (action 308), where the user may acquire a temporary subscription for his or her MSISDN or International Mobile Subscriber Identify (IMSI) (communication 310). In one embodiment, the visited portal 302 may allow the user to use a credit card, debit card, or other financial instrument to purchase this temporary subscription or other benefit.

In one embodiment, the UE 204 also acquires the network address of an Application Server (AS) and instructions for configuring the immediate transfer of terminating sessions service, referred to as explicit communication transfer, where all terminating sessions to a UE are transferred to that AS. (An example of this is shown in more detail in FIG. 5, below.)

In the embodiment illustrated in FIG. 3, the visited portal 302 notifies the MME 206 that the IMSI/MSISDN was granted a temporary subscription (message 312). This step can be performed online (e.g., over the visited network 202) or offline (e.g., via some other communications channel between the visited portal 302 and the MME 206).

The UE 204 then attempts to attach to an IMS APN of the visited network 202 (message 314). In LTE, a Packet Data Network (PDN) connection towards any APN (e.g., an IMS APN, an Internet APN, etc.) typically involves an SGW/PGW. In the embodiment illustrated in FIG. 3, the UE 204 attempts to attach to gateway 300 (message 314). The MME 206, having been notified of the IMSI/MSISDN of the UE 204 in the previous phase, will determine that permission was granted (action 316) and notify the UE 204 of this fact, e.g., via an attach response (message 318). The UE 204 then establishes a connection 320 between the UE 204 and the gateway 300. In one embodiment, the MME 206 will also provide to UE 204 the address of the local Proxy Call/Session Control Function (P-CSCF). The UE 204 will then be able to register in the IMS of the visited network 202.

In another embodiment of manual roaming, the UE 204 sends an access request to the MME to request for access to the telecommunications network. The MME proceeds with authenticating the UE 204, if authentication is successful, the MME determines whether LOS are desired. If the MME determined that LOS are desired, it initiates a session towards an Access Point Name (APN) configured for LOS to connect the user to a portal for LOS. If LOS are not desired, the MME initiates the session towards a default Access Point Name (APN). On the other hand, if authentication of the UE was not successful, the MME would determine whether LOS are desired. If LOS are desired, the MME proceeds anyway to initiate a session towards an Access Point Name (APN) configured for LOS, hence connecting the user to a portal for LOS. But if LOS are not desired, the UE is denied access to the telecommunications network.

In the embodiment illustrated in FIG. 3, the user is able to acquire needed information via interaction with the visited portal 302, and the MME 206 is configured to allow UEs that failed authentication to be routed to the visited portal 302. In one embodiment, the MME 206 may be configured with specific domains for which this capability is available so that only a specific category for UEs failing authentication can be directed to the visited portal 302.

FIG. 4 is a signaling message diagram illustrating messages communicated among components of a telecommunications network according to another aspect of the present disclosure. FIG. 4 illustrates an example UE registration in an IMS domain. In the embodiment illustrated in FIG. 4, a visited IMS network 400 includes the UE 204 and the visited portal 302, but also includes a P-CSCF 402 and a Serving CSCF (S-CSCF) 404. In one embodiment, the P-CSCF 402 and/or the S-CSCF 404 may be configured for handling manual roamers.

In the embodiment illustrated in FIG. 4, the UE 204 requests registration in the IMS domain via a Session Initiation Protocol (SIP) REGISTER message (message 406) sent to the P-CSCF 402 which includes a feature tag to indicate its support for RLOS. In one embodiment, P-CSCF 402 retrieves the IMSI from the SIP instance feature tag or other appropriate header of the SIP REGISTER message (action 408), which the P-CSCF 402 then sends to the visited portal 302 for validation (message 410). In the embodiment illustrated in FIG. 4, the IMSI number is validated by the visited portal 302, which sends to the P-CSCF 402 a response message indicating that the IMSI was successfully validated (message 412). In an alternative embodiment, the visited portal 302 may push the list of approved IMSIs to the P-CSCF 402 through off-line means rather than via messages 410 and 412.

In the embodiment illustrated in FIG. 4, upon successful validation of the IMSI, the P-CSCF 402 creates a record that comprises an indication that the user is a LOS user the UE 204 and allocates a special S-CSCF, such as C-CSCF 404, without performing any real IMS registration (action 414) and accepts the registration. In response to communication from the P-CSCF 402 (communication 416), the S-CSCF 404 creates a record for the UE where it includes an indication that the user is a LOS user, and allocates a default profile for it to enable the UE to originate and receive calls (action 418). The S-CSCF 404 notifies the P-CSCF 402 of the result (message 420). The P-CSCF 402 then notifies the UE 204 that SIP registration was successful (message 422).

It is noted that, in one embodiment, the SIP signaling shown in FIG. 4 is not encrypted since Internet Protocol Security (IPSEC) is not established yet. In some embodiments, the SIP signaling can remain unencrypted. In other embodiments, these nodes can have IPSEC established across them, protecting all traffic. In yet another embodiment, the P-CSCF 402 may interact with an authentication node and emulate a registration for the sake of exchanging keys and other information to enable the creation of an IPSEC Security Association (SA). Yet another approach is to establish Transport Layer Security (TLS) first and then perform SIP registration.

In another aspect, a UE desiring access to RLOS performs regular IMS registration and must include a feature tag to indicate its support for RLOS. If the P-CSCF cannot authenticate the user, it shall create a temporary record and mark the user as "RLOS only user". The P-CSCF shall forward the request to a special S-CSCF dedicated to RLOS and configured in the P-CSCF. The S-CSCF creates a default profile for the UE, and the registration is accepted. If an I-CSCF is used to route the SIP message to an S-CSCF, the I-CSCF allocates to the UE a S-CSCF that supports RLOS at UE registration. This implies that the I-CSCF also should be able to understand the new capability related to RLOS and allocates a S-CSCF supporting RLOS.

Mobile-Terminated Calls

Figure 5:
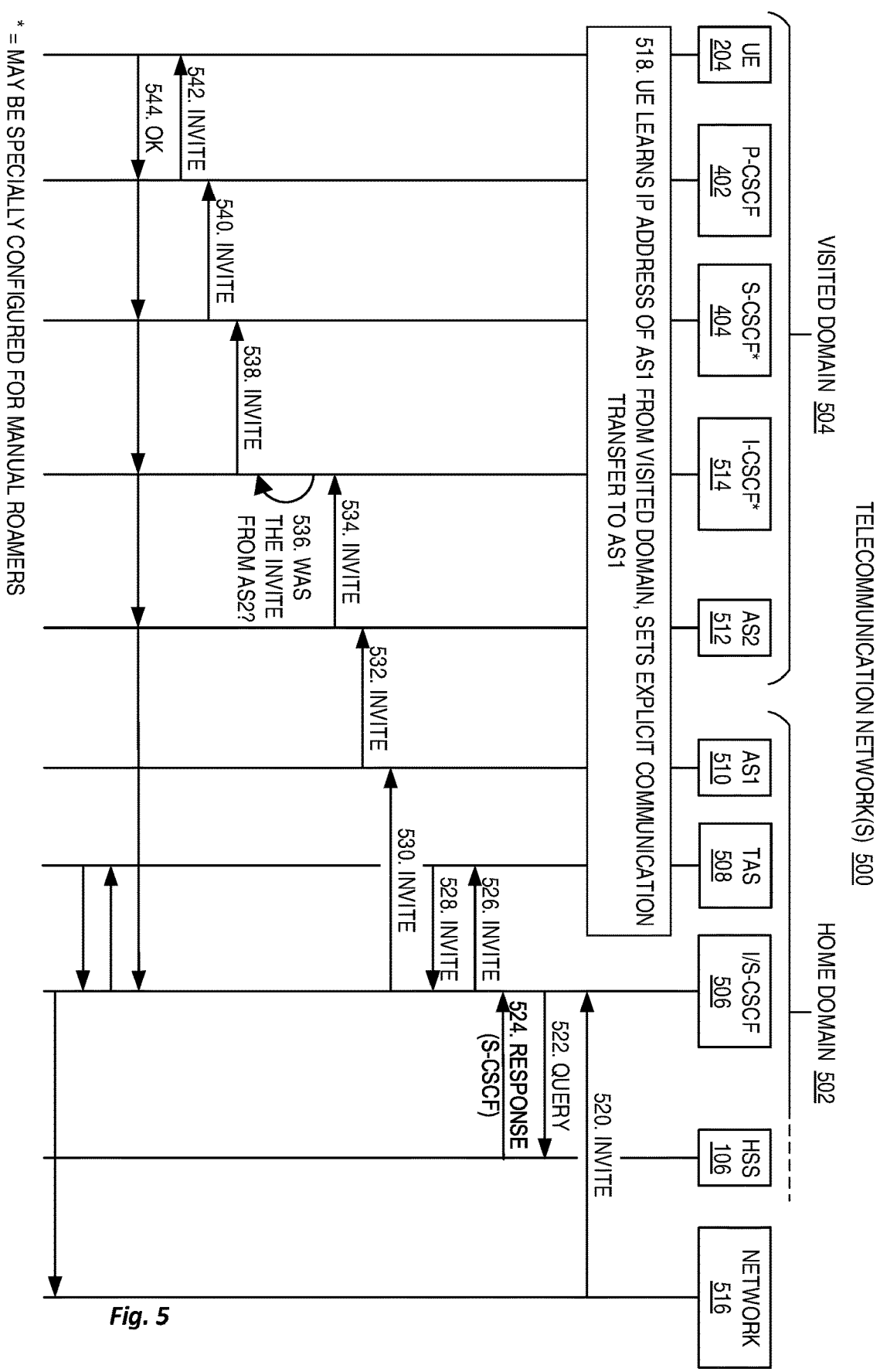

FIG. 5 is a signaling message diagram illustrating messages communicated among components of a telecommunications network according to another aspect of the present disclosure. FIG. 5 illustrates an example of how a mobile-terminated call may be handled during manual roaming. In the embodiment illustrated in FIG. 5, telecommunications network 500 comprises a home domain 502 and a visited domain 504.

In the embodiment illustrated in FIG. 5, the home domain 502 includes an HSS 106, an Interrogating/Serving-CSCF (I/S-CSCF) 506, a Telephony Application Server (TAS) 508, and a first Application Server (AS1) 510. In the embodiment illustrated in FIG. 5, an I/S-CSCF is a network entity in which the functions of an I-CSCF and the functions of an S-CSCF are co-located. In alternative embodiments, the I-CSCF and S-CSCF may be distinct entities that are not co-located.

The TAS 508 is the entity via which users can configure their communications transfer services, such as configuring terminating sessions to be transferred to a particular network node. For example, once the user learns the IP address of AS1 510, the user can configure the transfer services so that all terminating calls to the user's MSISDN are transferred to the AS1 510. In one embodiment, a user may use Extensible Markup Language (XML) Configuration Access Protocol (XCAP) to configure his or her transfer service in the TAS 508. Alternatively, a roaming user is unable to access his or her home domain 502, e.g., because there is no roaming agreement between the visited domain 504 and the home domain 502, the user can call the operator to request such a transfer. Alternatively, the user may be able to access the TAS 508 via a regular internet connection, which does not require a roaming agreement. Since an TAS is typically used for both wired and wireless access, the user typically can use the cellular network or a fixed network to configure his or her profile.

For SIP signaling, an IMS application in the UE 204 uses the IMS well-known APN; the UE 204 should prevent non-IMS applications from using this APN.

In the embodiment illustrated in FIG. 5, the visited domain 504 includes a P-CSCF 402, an S-CSCF 404, whose functions are essentially identical to the like-numbered elements in FIG. 4, the description of which is therefore not repeated here. In the embodiment illustrated in FIG. 5, the visited domain 504 includes a second Application Server (AS2) 512. In the embodiment illustrated in FIG. 5, AS1 510 is configured to proxy incoming SIP INVITE messages to AS2 512, e.g., AS1 510 is configured with the address of AS2 512. In one embodiment, both AS1 510 and AS2 512 would be owned or controlled by the visited domain 504, even though AS1 510 is physically located within the home domain 502. In such embodiments, both AS1 510 and AS2 512 may have the same domain name, e.g., the domain name of the visited domain 504. In an alternative embodiment (not shown), a single AS may be used rather than a pair; in such embodiments, the AS would typically reside in the visited domain.

In the embodiment illustrated in FIG. 5, AS2 512 is configured to proxy all incoming INVITEs to an Interrogating-CSCF (I-CSCF) 514 configured to handle manual roamers, e.g., the I-CSCF 514 does not perform normal processing when it receives an incoming request from AS2 512, but instead just proxies such requests to the S-CSCF 404, which may be allocated for manual roamers.

An example operation in which the UE 204 is the intended destination of a mobile-terminated call from an entity within the home domain 502, shown generically in FIG. 5 as a coming from network 516, e.g., someone is calling the phone number of the user of the UE 204, hereinafter referred to as "the user," will now be described.

In the embodiment illustrated in FIG. 5, prior to the occurrence of the mobile terminated call towards the UE 204, the visiting domain 504 provides to the UE 204 the IP address (or other form of network address) of the AS1 510, and the UE 204 sets explicit transfers of some communications to the AS1 510, e.g., using the TAS 508 as described above (block 518). These steps may occur as part of block 310 of FIG. 3, for example, or may occur after block 310 of FIG. 3. The SIP protocol, for example, allows a session to be transferred to another SIP URI to be resolved by the SIP network, to another Tel URI, or to just a pure IP address, where the INVITE is forwarded to the IP addresses provided by, for example, visited portal 302 in FIG. 3. In one embodiment, the operator of the home domain 502 may provision the UE 204 with one or more URLs that can be used to configure transfer services. As mentioned above, those URLs may be contacted via the cellular network or via another wireless network, e.g., via a fixed Internet network.

There are several ways that this configuration may occur. For example, in one embodiment, the visited domain 504 may provide a configuration script that is executed by the UE 204. In one embodiment, this script may read XCAP URLs and perform the XCAP configuration. In another embodiment, the user may send the IP address provided by the visited portal 302 in a Short Message Service (SMS) or text message to the operator of the home domain 504, who will perform the necessary configuration administratively. In yet another embodiment, the user may connect to a website or other configuration portal and perform the necessary configuration steps there.

In the embodiment illustrated in FIG. 5, an incoming call to the UE 204 starts with the network 516 issuing a message, such as a SIP INVITE (message 520), to the I/S-CSCF 506. This message includes the MSISDN of the roaming user, e.g., in the Request-URI as a Tel-URI, for example.

The I-CSCF function within I/S-CSCF 506 responds to message 520 by querying the HSS 106 for authentication information related to the MSISDN of the called user (message 522), to which the HSS 106 responds (message 524). The user may have registered in the home domain 502, in which case the user's profile is retrieved. The user may not have registered in the home domain 502, in which case the user has an unregistered profile. In one embodiment, whether the user is registered or not, the response from the HSS 106 will include the identity of an S-CSCF that has been allocated to or registered to the user in the user's home domain 502. In the embodiment illustrated in FIG. 5, that S-CSCF is I/S-CSCF 506. For the purposes of illustration, it will be assumed for the call flow illustrated in FIG. 5 that the user is not yet registered, and so the HSS 106 returned an unregistered profile.

In one embodiment, the I-CSCF function forwards the INVITE message to the S-CSCF function. Where the I-CSCF function is co-located with the S-CSCF function, as in the embodiment illustrated in FIG. 5, the INVITE message is forwarded internally within the I/S-CSCF 506. In one embodiment, the S-CSCF function fetches the unregistered profile from the HSS 106 (not shown).

In the embodiment illustrated in FIG. 5, the I/S-CSCF 506 forwards the INVITE to the TAS 508 (message 526). The TAS 508 transfers the session to the configured IP address belonging to the AS1 510, and then sends the INVITE to the I/S-CSCF 506 for further routing (message 528).

In the embodiment illustrated in FIG. 5, the I/S-CSCF 506 forwards the INVITE message to the AS1 510 (message 530), which proxies the message to AS2 512 (message 532), which forwards the message to I-CSCF 514 (message 534), which is an I-CSCF in the visited domain 504. The I-CSCF 514 determines that the incoming request message 526 came from AS2 512 (action 536), and therefore just proxies that request to the S-CSCF allocated for manual roamers, e.g., S-CSCF 404 (message 538).

Once the INVITE message is in the visited domain 504, the S-CSCF 404 and the P-CSCF 402 process the message normally. For example, when the INVITE arrives at the P-CSCF 402 (message 540) the P-CSCF 402 locates the IP address for the MSISDN of the UE 204 and proxies the INVITE to the UE 204 (message 542). Assuming that the connection is made to the UE 204, the response messages 544, such as a SIP 200 OK message, are passed back through the visited domain 504 and the home domain 502, and ultimately to the network 516.

The concepts disclosed in herein provide solutions to some existing issues related to access to Restricted Local Operator Services (RLOS) and are equally applicable to issues related to unrestricted Local Operator Services (LOS). For simplicity of description, the term "RLOS" as used hereinafter will be understood to refer to LOS, to RLOS, or to both LOS and RLOS. Exception is when an originating call for RLOS or LOS is requested by a UE.

RLOS—EPC

An exemplary implementation of the subject matter described herein within an Evolved Packet Core (EPC) will now be described with reference to network entities shown in FIG. 3. In one embodiment, the UE 204 that desires to access RLOS should include an indication of such in the initial attach. This is an explicit request to connect to RLOS. For example, the Attach request (message 304) includes an indication "RLOS."

If the UE 204 fails to authenticate (action 306, message 308) and the initial attach (message 304) included the RLOS indication, the MME 206 initiates a session towards the configured APN dedicated to RLOS (e.g., via gateway 300), and which connects the user to an operator portal for RLOS services (e.g., visited portal 302). To enable such a connection, the MME 206 and/or a PCEF/PCRF (not shown) shall be configured with an APN dedicated for RLOS for that purpose.

If the UE 204 successfully authenticated, however, and included the RLOS indication in the initial attach message, then the MME 206 will initiate a session towards the configured APN dedicated to RLOS, and overrides the default APN in the profile of the UE 204.

In one embodiment, the PGW (e.g., the gateway 300) will have a pre-defined rule dedicated for access to the APN used for RLOS that is activated by the PCRF if deployed or activated by the PGW, and if the initial attach to portal is successful.

A UE that did not include an RLOS indication in initial attach and is not successfully authenticated shall be denied access.

A UE that included an RLOS indication in initial attach and is successfully authenticated will be connected to APN dedicated for RLOS. The MME will override the default APN in the profile in this case and establish a connection towards the APN dedicated to RLOS.

The PCEF will have a pre-defined rule associated with the APN dedicated to RLOS. The predefined rule is activated/modified by the PCRF once a UE is successfully attached towards the APN.

In one embodiment, the MME 206 in the serving network (e.g., in the visited network 202 in FIG. 3) supporting RLOS services is configured with an APN dedicated for RLOS and configured to implement the functionality described herein to support authenticated and non-authenticated UEs. In such embodiments, the MME 206 connects a UE that included an RLOS indication in initial attach to the APN dedicated for RLOS regardless of a successful or unsuccessful authentication.

In one embodiment, upon successful connection by the UE 204 to the APN dedicated to RLOS, the PCRF activates a rule that ensures that the UE is blocked from any other transaction with any other service other than the portal.

IMS

An exemplary implementation of the subject matter described herein within an IMS network will now be described with reference to network entities shown in FIG. 4. In one embodiment, the P-CSCF 402 is configured with a list of RLOS services supported by the operator, and both the P-CSCF 402 and the S-CSCF 404 are configured to support allowing IMS unregistered users as well as IMS registered users access to RLOS when an incoming session initiation request includes such an indication. In one embodiment, the P-CSCF 402 is configured with a list of S-CSCFs that support RLOS services, to which incoming registrations for unauthenticated RLOS users may be forwarded.

In one embodiment, a UE desiring access to RLOS must perform regular IMS registration and must include a feature tag to indicate its support for RLOS. In the embodiment illustrated in FIG. 4, for example, the UE 204 desires access to RLOS and thus has inserted a special indicator in a IMS registration request. For example, the SIP REGISTER (message 406) includes the feature tag to indicate "RLOS." Including a special indication by the UE 204 to access RLOS in conjunction with a configured list of RLOS in the P-CSCF 402 ensures that UE can not access any other services when accessing RLOS. This ensures that authenticated users can't use such an indication to access other services and be charged at the RLOS rate, which can be free. In one embodiment, the S-CSCF 404 shall ensure that such an indication is included in the Call Detail Record (CDR). In one embodiment, a P-CSCF that supports RLOS may also be used for regular IMS users.

Unauthenticated users. In one embodiment, if the P-CSCF 402 cannot authenticate the user, the P-CSCF 402 may create a temporary record and mark the user as "RLOS only user." In one embodiment, the P-CSCF 402 may then forward the request to a special S-CSCF dedicated to RLOS and configured in the P-CSCF, e.g., S-CSCF 404. In one embodiment, the S-CSCF 404 creates a default profile for the UE, and the registration is accepted.

Authenticated users. In one embodiment, for authenticated users, the I-CSCF (not shown in FIG. 4) will allocate to the UE 204 a S-CSCF that supports RLOS (e.g., S-CSCF 404) at UE registration. In such embodiments, the I-CSCF is configured to understand a new capability related to RLOS and to allocate, at registration time, an S-CSCF that supports that new capability if needed, e.g., when the IMS register request includes the RLOS feature tag.

In one embodiment, the UE 204 desiring access to RLOS inserts a special indicator in the session initiation request and includes the requested RLOS in the Request-URI of the session initiation request. Upon receipt by the P-CSCF 402 of such a request and if the P-CSCF 402 supports RLOS, the P-CSCF 402 will accept the session, provided that the requested RLOS service in the incoming R-URI is configured in the P-CSCF 402. In one embodiment, the P-CSCF 402 shall forward the incoming request to the S-CSCF allocated to the UE at registration, e.g., S-CSCF 404. In one embodiment, the P-CSCF 402 shall reject an incoming session without an RLOS indication for users marked as "RLOS only users."

In one embodiment, upon receipt by the S-CSCF 404 of a session request that includes an RLOS indication (i.e., an RLOS request), then the S-CSCF 404 routes the session towards the target. In one embodiment, no originating services shall be permitted, i.e., the UE profile for authenticated users is not considered.

In one embodiment, the S-CSCF shall include in the CDR an indication that the session is for RLOS. In one embodiment, The S-CSCF shall route an incoming RLOS request to its target for a registered and unregistered UE. For authenticated UEs, no originating services shall be permitted, i.e., the UE profile is not considered.

In one embodiment, the UE will be pre-configured with the list of RLOS supported by the operator.

In one embodiment, an HSS should support enabling a S-CSCF to declare its ability to support RLOS. In one embodiment, the Gm interface is enhanced to enable conveying such capability. In one embodiment, the Cx interface is enhanced to support the new RLOS capability.

Figure 6:
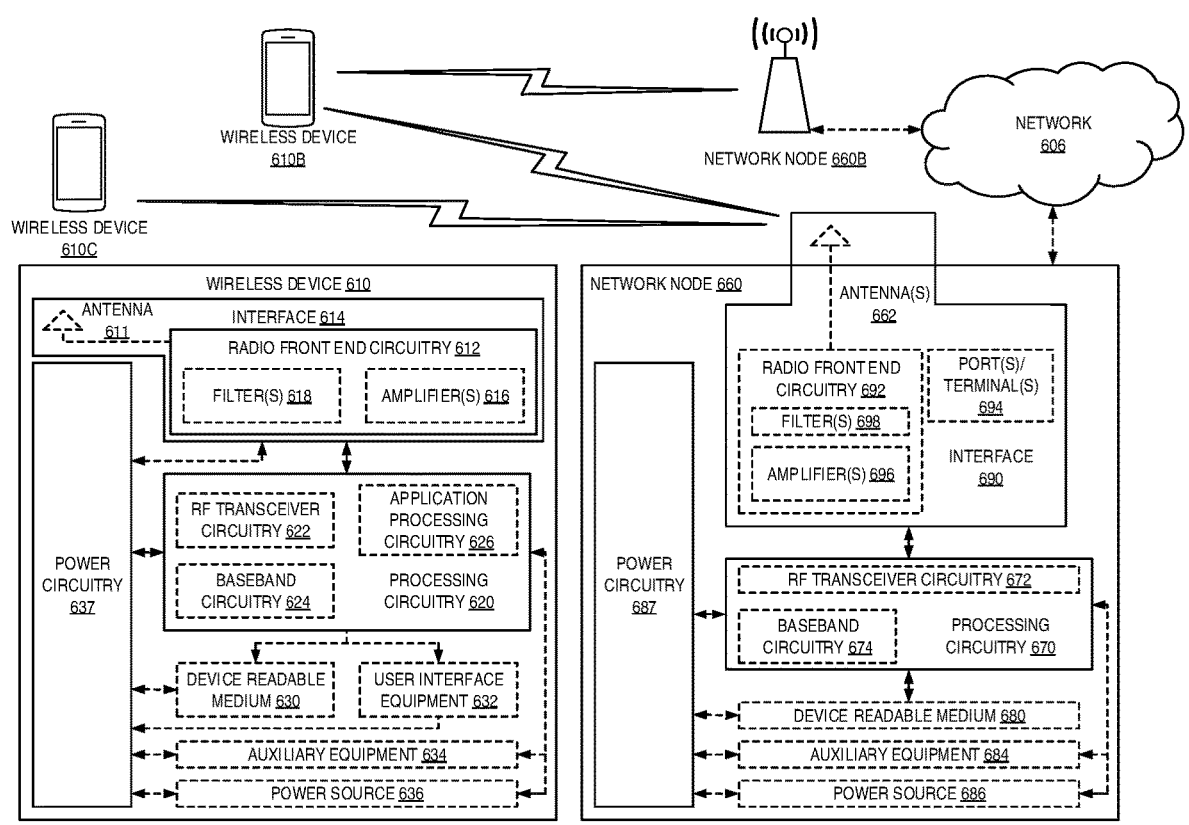
FIG. 6 illustrates a wireless network in accordance with some embodiments described herein.

Although the subject matter described herein may be implemented in any appropriate type of system using any suitable components, the embodiments disclosed herein are described in relation to a wireless network, such as the example wireless network illustrated in FIG. 6.

Originating Call for RLOS or LOS

1. For embodiments describing IMS originating calls, a UE requesting or registered for RLOS or LOS would be different in accordance with some embodiments. In LOS, a UE can call anyone. In RLOS a UE is restricted by what is configured in the P-CSCF. For RLOS, the SIP INVITE includes an indication for RLOS and the P-CSCF check the subscriber Registration record created at registration and verify the services that are allowed. For RLOS, this ensures that checks are done in the P-CSCF when the INVITE has a RLOS indication. In some embodiments, an RLOS user is only allowed to make calls, but not receive calls at all. However, LOS users would be allowed to call anyone, irrespective if the UE has passed or failed authentication. In some embodiment, a LOS indication in the SIP INVITE is not required, but can be included. This is because the information is already received at registration and verified by the P-CSCF and S-CSCF to ensure proper billing (against the credit card) is done.

Detailed Embodiments

FIG. 6 illustrates a wireless network in accordance with some embodiments described herein. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR Base Stations (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeBs. In such a scenario, each unique NodeB and RNC pair may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc., and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692. Instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 692 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data, and/or signals may be received from a wireless device, another network node, and/or any other network equipment. Similarly, antenna 662, interface 690, and/or processing circuitry 670 may be configured to perform any transmitting operations described herein as being performed by a network node. Any information, data, and/or signals may be transmitted to a wireless device, another network node, and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged, and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636, and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data, and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprises one or more filters 618 and amplifiers 616. Radio front end circuitry 612 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc., and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
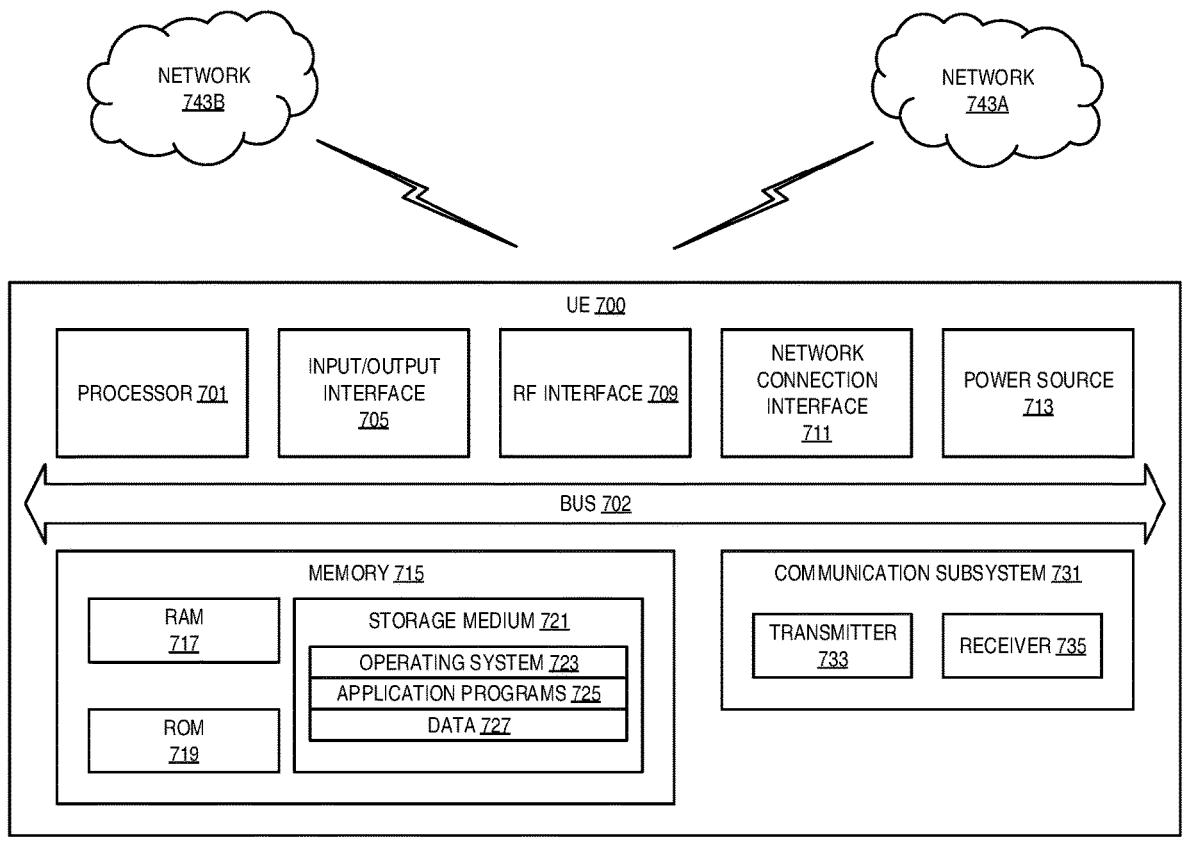
FIG. 7 illustrates a user equipment in accordance with some embodiments described herein.

FIG. 7 illustrates a user equipment in accordance with some embodiments described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743*a*. Network 743*a* may encompass wired and/or wireless networks such as a local-area network (LAN), a wide-area network (WAN), a computer network, a wireless network, a telecommunications network, another like network or any combination thereof. For example, network 743*a* may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software, or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits, and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
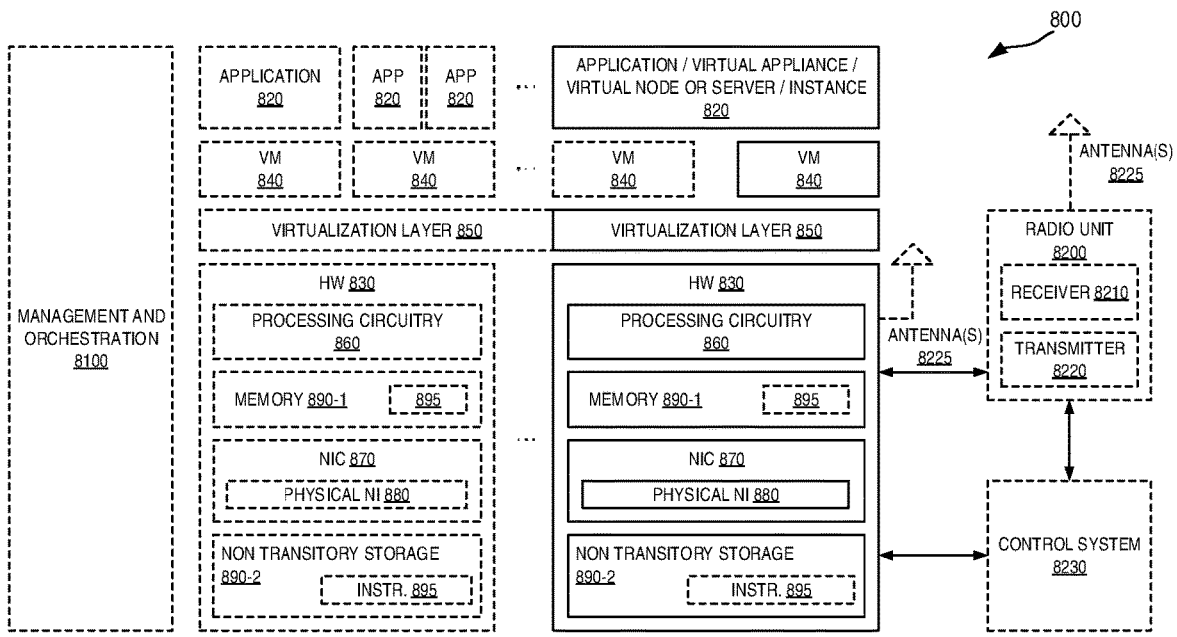
FIG. 8 is a schematic block diagram illustrating a virtualization in accordance with some embodiments described herein.

FIG. 8 is a schematic block diagram illustrating a virtualization in accordance with some embodiments described herein. FIG. 8 illustrates a virtualization environment 800 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), and then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g., such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
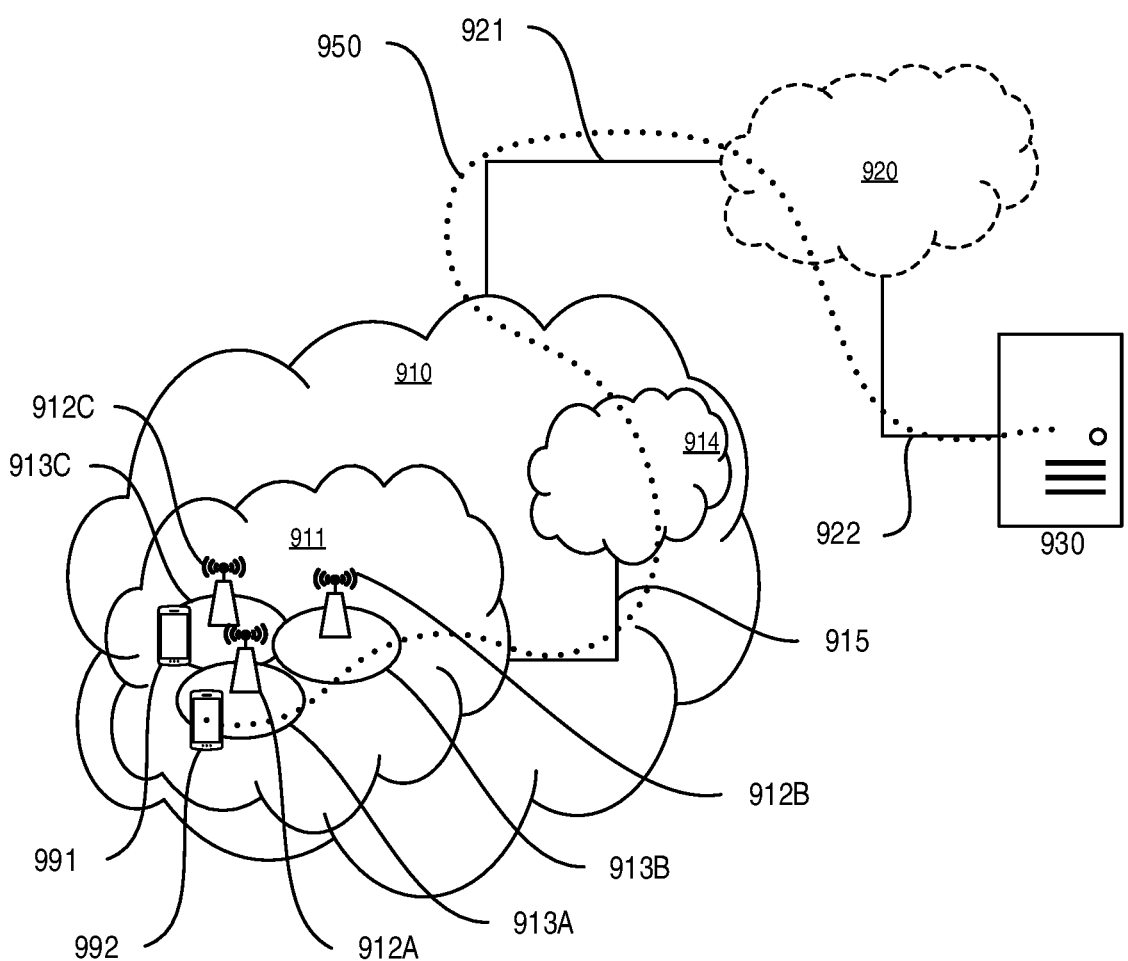
FIG. 9 schematically illustrates a telecommunication network connected via an intermediate network to a host computer in accordance with some embodiments described herein.

FIG. 9 is a schematic block diagram illustrating a telecommunication network connected via an intermediate network to a host computer in accordance with some embodiments described herein. With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server, or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private, or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station, and host computer discussed in the preceding paragraphs will now be described with reference to FIG. 10.

Figure 10:
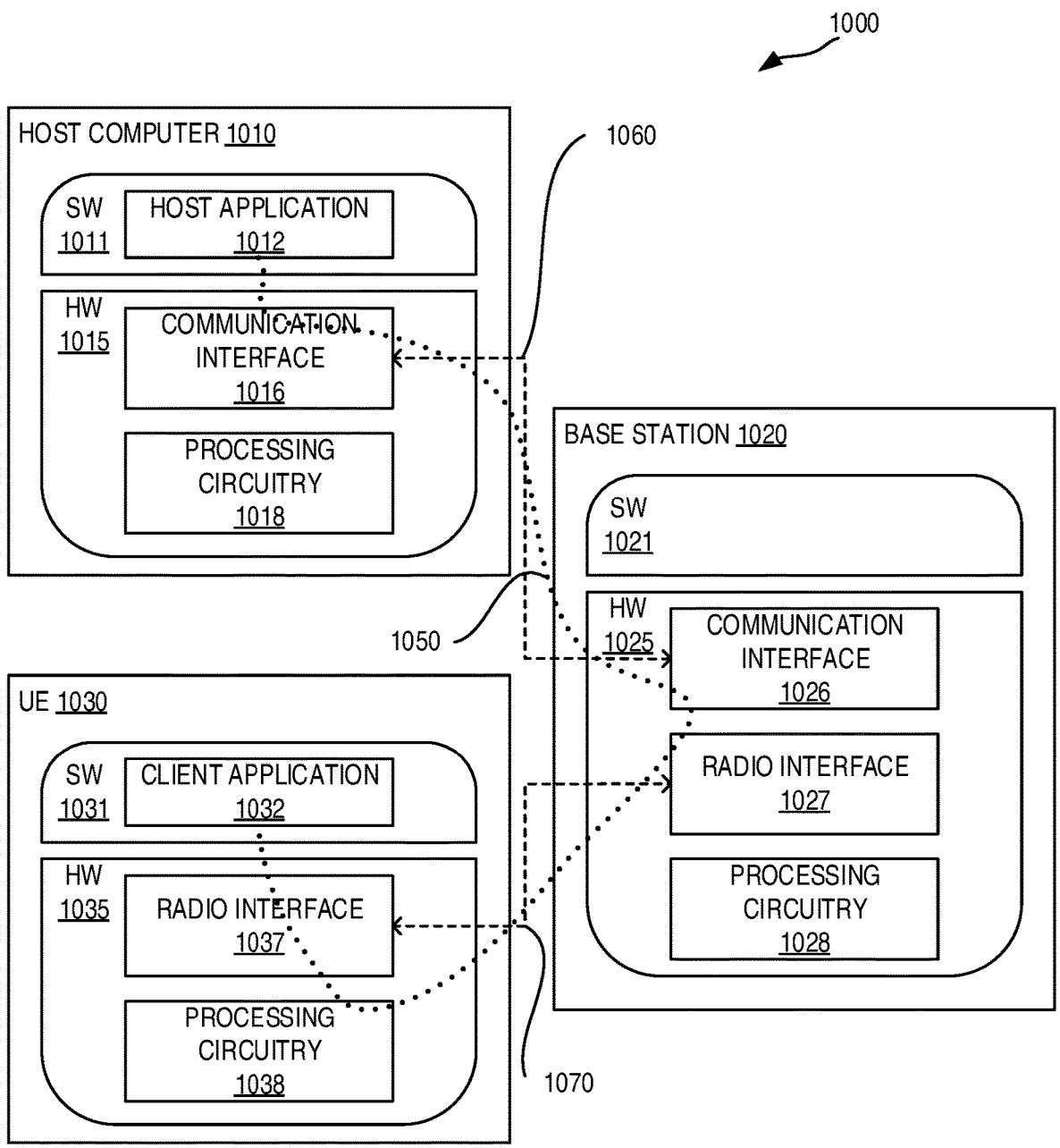
FIG. 10 is a generalized block diagram of a host computer communicating via a base station with a user equipment over a partially wireless connection in accordance with some embodiments described herein.

FIG. 10 is a generalized block diagram of a host computer communicating via a base station with a user equipment over a partially wireless connection in accordance with some embodiments described herein. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the ability to support manual roamers and thereby provide benefits such as allowing manual roamers to use their original MSISDN numbers while roaming in a visited network which has not roaming agreement with their home network, and such as allowing visited networks to conveniently charge fees to manual roamers for the privilege of using their original MSISDN numbers while roaming on the visited network.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency, and the like. The measurements may be implemented in that software 1011 and 1031 causes messages to be transmitted, in particular empty or 'dummy' messages, using OTT connection 1050 while it monitors propagation times, errors etc.

Figure 11:
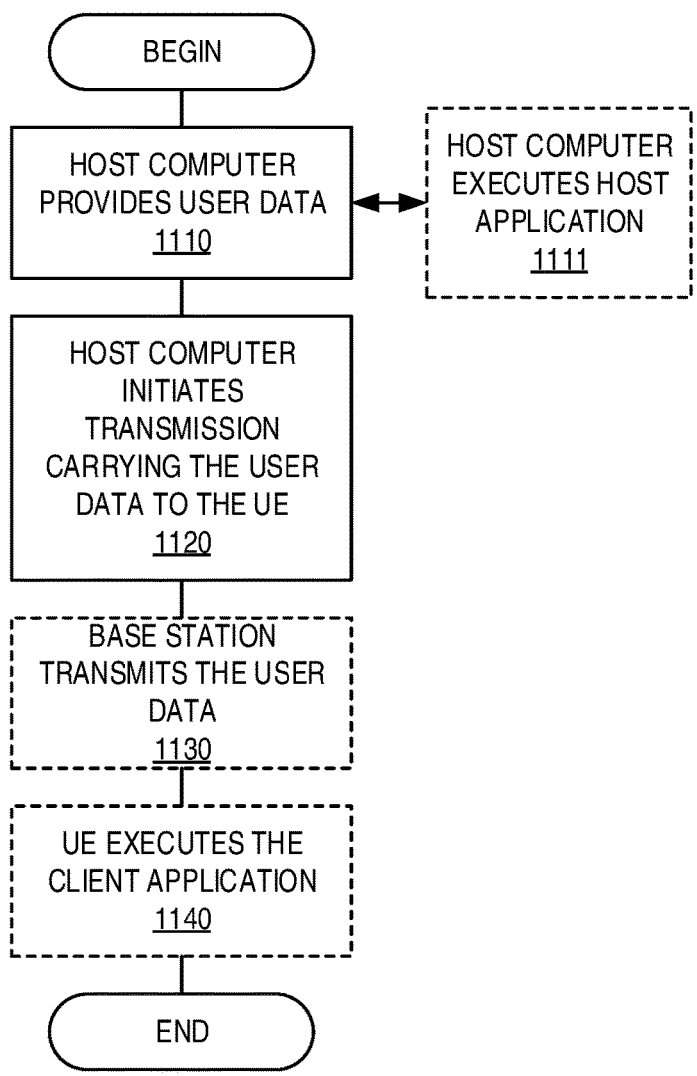
FIG. 11 is a flowchart illustrating methods implemented in a communication system including a host computer, a base station and a user equipment in accordance with some embodiments described herein.

FIG. 11 is a flowchart illustrating methods implemented in a communication system including a host computer, a base station, and a user equipment in accordance with some embodiments described herein. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
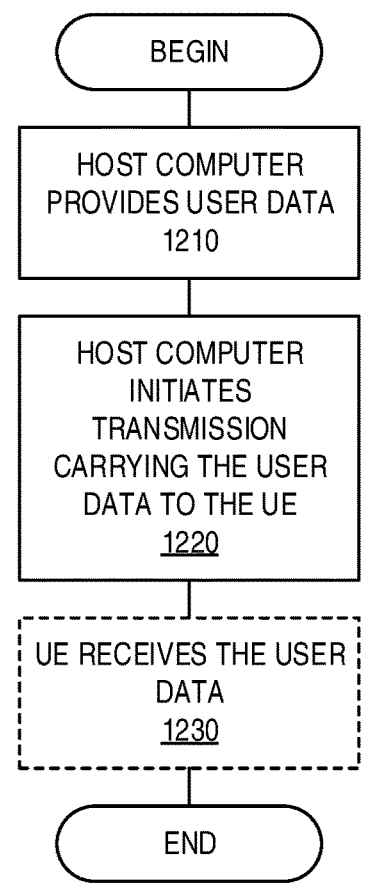
FIGS. 12 to 14 are flowcharts illustrating methods implemented in a communication system including a host computer, a base station and a user equipment in accordance with some embodiments described herein.

FIG. 12 is a flowchart illustrating methods implemented in a communication system including a host computer, a base station, and a user equipment in accordance with some embodiments described herein. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figures 13, 14:
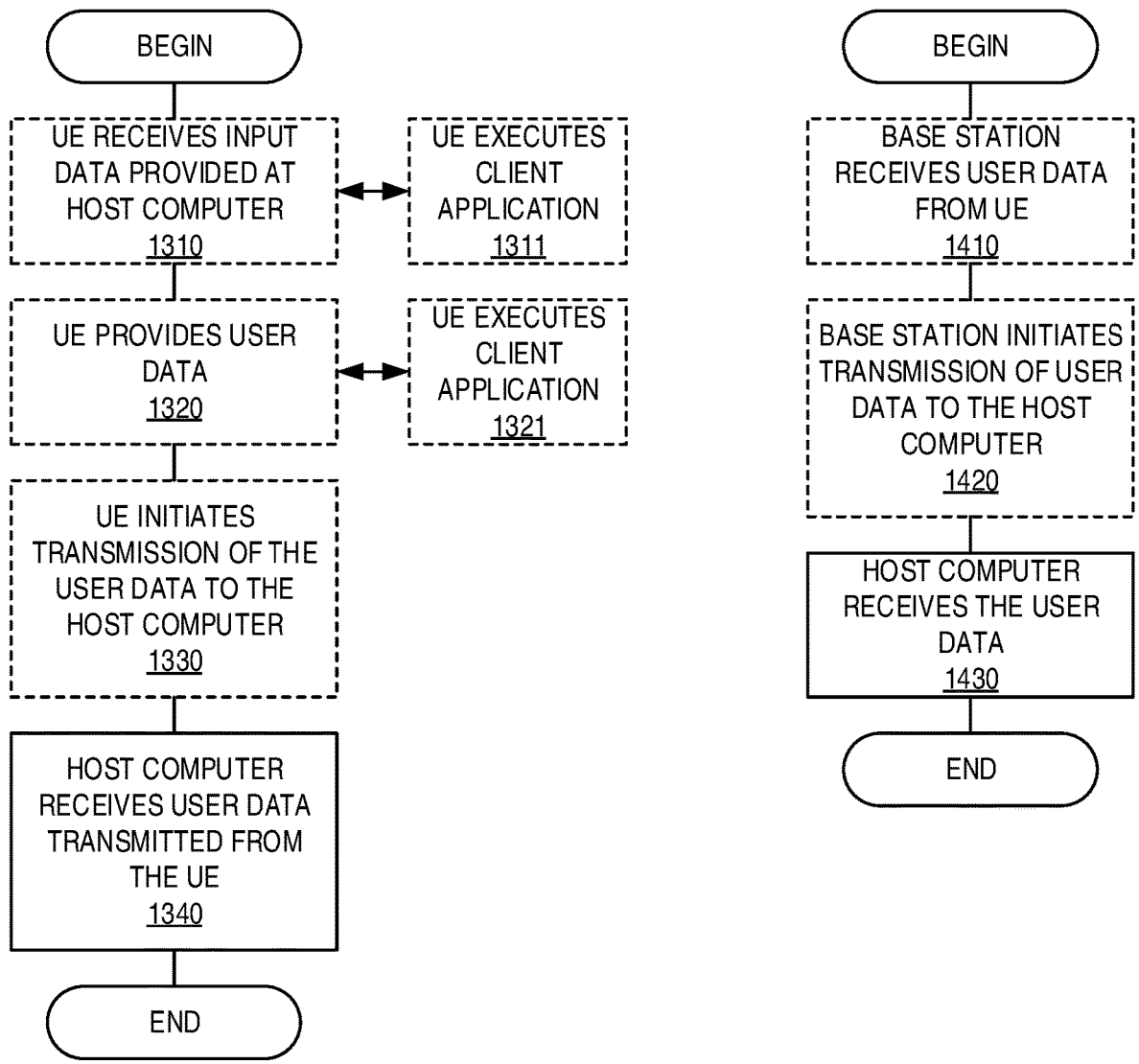

FIG. 13 is a flowchart illustrating methods implemented in a communication system including a host computer, a base station, and a user equipment in accordance with some embodiments described herein. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 14 is a flowchart illustrating methods implemented in a communication system including a host computer, a base station, and a user equipment in accordance with some embodiments described herein. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
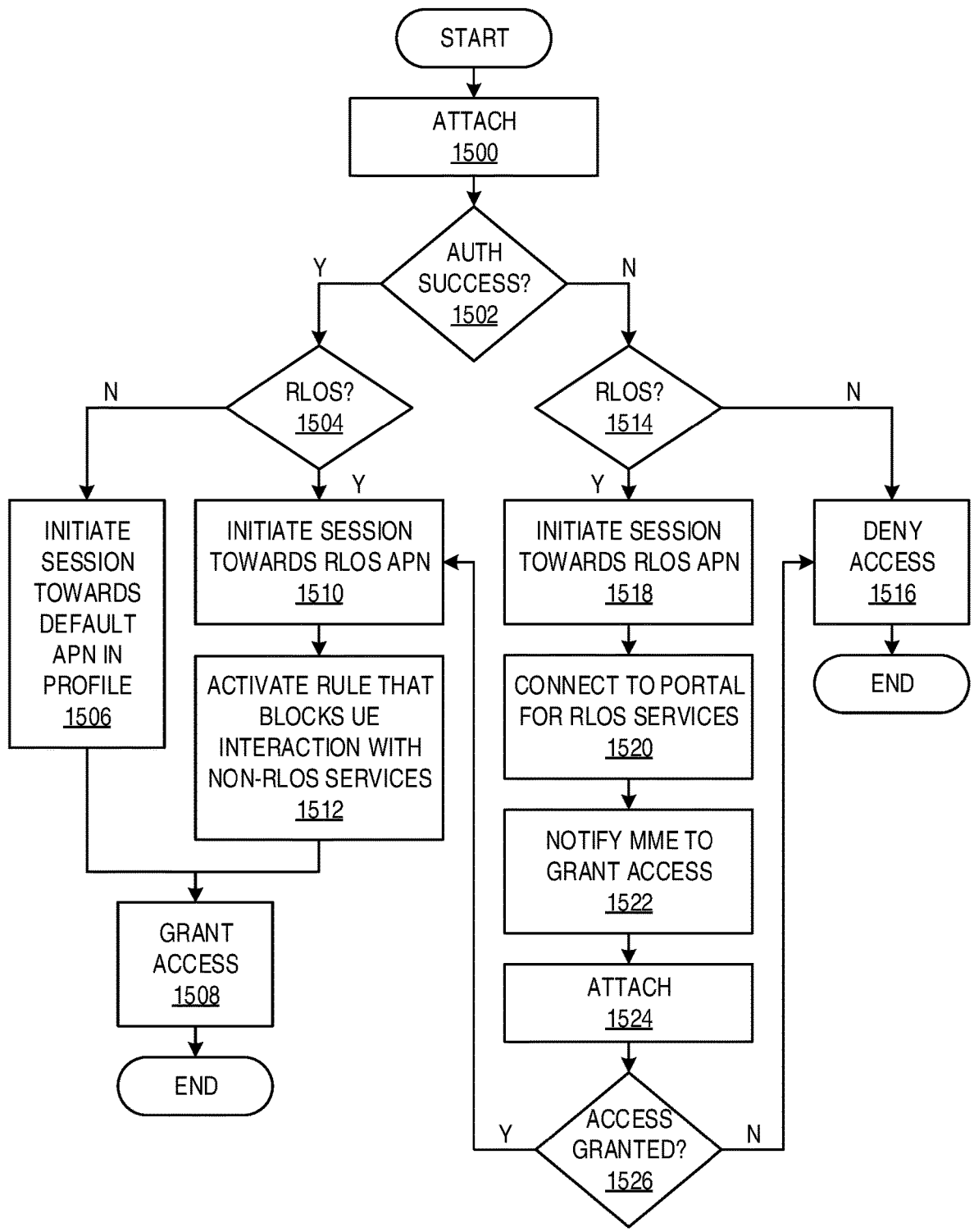
FIG. 15 depicts a method in accordance with some embodiments described herein.

FIG. 15 depicts a method in accordance with some embodiments described herein. In the embodiment illustrated in FIG. 15, the method begins at step 1500, in which a UE attempts to attach to an EPC network. In one embodiment, an MME receives an attach message that may or may not include an RLOS indicator. The MME attempts to authenticate the UE.

At step 1502, if the UE was authenticated, the MME checks to see whether RLOS was indicated (step 1504). If not, the MME initiates a session towards the default APN in the UE's profile (step 1506) and then grants access (step 1508). If, at step 1504, RLOS was indicated, then the MME initiates a session towards the RLOS APN (step 1510), activates a rule that blocks the UE from engaging in interactions with non-RLOS services (step 1512), and grants access to the EPC network (step 1508). The process ends when access is granted.

On the other hand, if at step 1502 if the UE could not be authenticated, the process goes to step 1514, in which the MME checks to see whether RLOS was indicated. If RLOS was not indicated, the MME will deny access (step 1516) and the process ends unless the MME has an option to override. If, at step 1514, RLOS was indicated, then the MME initiates a session towards an APN set up especially for RLOS (step 1518). The UE is thus connected to a portal for RLOS services (step 1520). If the user makes arrangements to have access to RLOS services, the portal may instruct the MME to grant access to that UE (step 1522). The UE then tries to attach again (step 1524), and the MME checks to see if the UE has been granted access (step 1526). If access is still not granted, the UE is denied access (step 1516) and the process ends. If the UE is granted access, however, the process goes to step 1510 and continues until access is granted at step 1508.

Figure 16:
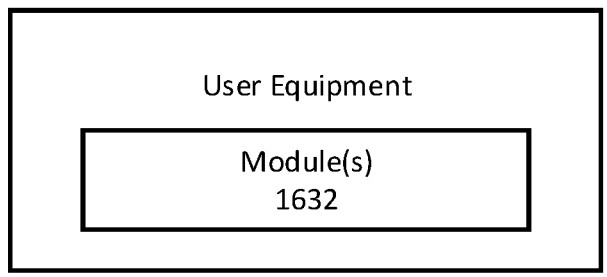
FIG. 16 illustrates a user equipment in accordance with some other embodiments described herein.

FIG. 16 is a schematic block diagram of the user equipment, UE, according to some other embodiments of the present disclosure. The user equipment includes one or more modules 1632, each of which is implemented in software. The module(s) 1632 provide the functionality of the UE described herein.

Figure 17:
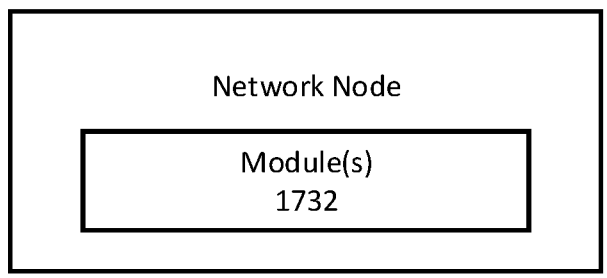
FIG. 17 illustrates a network node implementing an MME, CSCF, AS or network portal in accordance with embodiments described herein.

FIG. 17 is a schematic block diagram of a network node that implements either one of the functions MME or AMF, a CSCF, a TAS, or a network portal according to some other embodiments of the present disclosure. The network node includes one or more modules 1732, each of which is implemented in software. The module(s) 1732 provide the functionality of any of the functions described herein.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
AC Alternating Current
AP Access Point
ASIC Application-Specific Integrated Circuit
BS Base Station
BSC Base Station Controller
BTS Base Transceiver Station
CD Compact Disk
COTS Commercial, Off-The-Shelf
CPE Customer-Premises Equipment
CPU Central Processing Unit
CSCF Call/Session Control Function
D2D Device-to-Device
DAS Distributed Antenna System
DC Direct Current
DIMM Dual In-line Memory Module
DSP Digital Signal Processor
DVD Digital Video Disk
EEA EPS Encryption Algorithm
EEA0 EPS Encryption Algorithm 0
EEPROM Electronically Erasable Programmable Read-Only Memory
eMTC Enhanced Machine-Type Communication
eNB Enhanced or Evolved Node B
EPROM Erasable Programmable Read-Only Memory
EPS Evolved Packet System
gNB New Radio Base Station
GPS Global Positioning System
GSM Global System for Mobile Communications
HDDS Holographic Digital Data Storage
HD-DVD High Definition Digital Video Disk
HSS Home Subscriber Server
IMSI International Mobile Subscriber Identity
IoT Internet of Things
LAN Local Area Network
LEE Laptop-Embedded Equipment
LME Laptop-Mounted Equipment
LTE Long Term Evolution
M2M Machine-to-Machine
MANO Management and Orchestration
MCE Multicell/multicast Coordination Entities
MME Mobility Management Entity
MSISDN Mobile Station International Subscriber Directory Number
MSR Multi-Standard Radio
MTC Machine-Type Communication
NAS Non-Access Stratum
NB Node B
NB-IoT Narrowband Internet of Things
NFV Network Function Virtualization
NR New Radio
OTT Over-The-Top
P-CSCF Proxy Call/Session Control Function
PDA Personal Digital Assistant
PROM Programmable Read-Only Memory
PSTN Public Switched Telephone Network
RAID Redundant Array of Independent/Inexpensive Disks
RAM Random-Access Memory
RAN Radio Access Node
RAT Radio Access Technology
RF Radio Frequency
RNC Radio Network Controller
ROM Read-Only Memory
RRC Radio Resource Control
RRH Remote Radio Head
RRU Remote Radio Unit
S-CSCF Serving Call/Session Control Function
SDRAM Synchronous Dynamic Random-Access Memory
SIP Session Initiation Protocol SOC System On a Chip
UE User Equipment
UMTS Universal Mobile Telecommunications System
UP User Plane
V2I Vehicle-to-Infrastructure
V2V Vehicle-to-Vehicle
V2X Vehicle-to-Everything
VMM Virtual Machine Monitor
VNE Virtual Network Elements
VNF Virtual Network Function
VoIP Voice over Internet Protocol
WAN Wide Area Network
WD Wireless Device
WiMax Worldwide Interoperability for Microwave Access
WLAN Wireless Local Area Network
XCAP Extensible Markup Language (XML) Configuration Access Protocol Those skilled in the art will recognize improvements and modifications to the embodiments of the present disclosure. All such improvements and modifications are considered within the scope of the concepts disclosed herein.

What is claimed is:

1. A method for manual roaming in a telecommunications network, the method comprising:
   at a User Equipment, UE:
      sending, to a Proxy Call/Session Control Function, P-CSCF, in the telecommunications network, a request for establishing a session to access the telecommunications network, the request comprising an indication that the UE supports Restricted Local Operator Services, RLOS;
   at the P-CSCF:
      receiving from the UE, the request for establishing the session;
      in response to determining that the UE is not authenticated, sending the request to a Serving Call/Session Control Function, S-CSCF, to indicate that the UE is a RLOS user;
      in response to determining that the UE is authenticated, sending the request to the S-CSCF to indicate that the UE is a Local Operator Service, LOS, user;
   at the S-CSCF:
      receiving the request from the P-CSCF;
      determining whether the request is for RLOS or LOS;
      in response to determining that the request is for RLOS, creating a record for the UE and a default profile allowing the UE to only make calls; and
      in response to determining that the request is for LOS, creating the default profile allowing the UE to make and receive calls; and
   at the UE:
      performing one of the following actions:
         establishing an Internet Protocol, IP, Multimedia Subsystem, IMS, session based on the default profile created by the S-CSCF to thereby only make calls if the UE is determined to be the RLOS user; and
         establishing an IMS session with a selected CSCF determined by the P-CSCF to thereby make and receive calls if the UE is determined to be the LOS user.

2. The method of claim 1 wherein the request sent from the UE to the P-CSCF comprises a Session Initiation Protocol, SIP, REGISTER message.

3. A method for manual roaming in a telecommunications network, the method comprising:
   at a Proxy Call/Session Control Function, P-CSCF:
      receiving from a User Equipment, UE, a Session Initiation Protocol, SIP, INVITE message for establishing a session;
      in response to determining that the UE is not authenticated, sending a request to a Serving Call/Session Control Function, S-CSCF, to indicate that the UE is a Restricted Local Operator Service, RLOS, user;
      in response to determining that the UE is authenticated, sending the request to the S-CSCF to indicate that the UE is a Local Operator Service, LOS, user; and
   at the S-CSCF:
      receiving the request from the P-CSCF;
      determining whether the request is for RLOS or LOS;
      in response to determining that the request is for RLOS, creating a record for the UE and a default profile allowing the UE to only make calls; and
      in response to determining that the request is for LOS, creating the default profile allowing the UE to make and receive calls.

4. The method of claim 3 wherein the request comprises a SIP REGISTER message or a SIP INVITE message.

* * * * *